US009260092B1

(12) United States Patent
Lombrozo

(10) Patent No.: US 9,260,092 B1
(45) Date of Patent: Feb. 16, 2016

(54) METHODS AND SYSTEMS FOR STEERING-BASED OSCILLATORY VEHICLE BRAKING

(71) Applicant: Google Inc., Mountain View, CA (US)

(72) Inventor: Peter Craig Lombrozo, Scotts Valley, CA (US)

(73) Assignee: Google Inc., Mountain View, CA (US)

( * ) Notice: Subject to any disclaimer, the term of this patent is extended or adjusted under 35 U.S.C. 154(b) by 47 days.

(21) Appl. No.: 14/039,349

(22) Filed: Sep. 27, 2013

(51) Int. Cl.
| *A01B 69/00* | (2006.01) |
| *B60T 8/17* | (2006.01) |
| *B62D 6/04* | (2006.01) |
| *B62D 15/02* | (2006.01) |
| *B62D 1/00* | (2006.01) |
| *B62D 5/00* | (2006.01) |

(52) U.S. Cl.
CPC ... *B60T 8/17* (2013.01); *B62D 1/00* (2013.01); *B62D 5/00* (2013.01); *B62D 6/04* (2013.01); *B62D 15/02* (2013.01)

(58) Field of Classification Search
CPC ........ B60T 8/17555; B62D 1/00; B62D 5/00; B62D 5/0463; B62D 6/04; B62D 5/0478; B62D 15/02; G06F 19/00
USPC .................................. 701/41, 83, 45, 75, 78
See application file for complete search history.

(56) References Cited

U.S. PATENT DOCUMENTS

| 6,152,252 | A | * | 11/2000 | Pettersson | ..................... 180/282 |
| 6,173,221 | B1 | * | 1/2001 | Boehringen et al. | ............ 701/41 |
| 6,555,927 | B1 | * | 4/2003 | Suzuki et al. | ..................... 290/34 |
| 6,558,072 | B2 | * | 5/2003 | Staffenhagen | ........ E01C 19/286 |
| | | | | | 404/117 |
| 6,712,550 | B2 | * | 3/2004 | Fervers | ................... E02D 3/026 |
| | | | | | 404/122 |
| 6,719,087 | B2 | | 4/2004 | Demerly | |
| 6,988,570 | B2 | * | 1/2006 | Takeuchi | ...................... 180/6.48 |
| 7,416,264 | B2 | | 8/2008 | Tsukasaki | |
| 7,991,532 | B2 | | 8/2011 | Miki et al. | |
| 8,439,598 | B2 | * | 5/2013 | Norton | ............................ 404/75 |
| 8,831,854 | B2 | * | 9/2014 | Killian et al. | ................... 701/83 |
| 2002/0167218 | A1 | | 11/2002 | Chubb | |
| 2002/0172556 | A1 | * | 11/2002 | Staffenhagen | ........ E01C 19/286 |
| | | | | | 404/117 |
| 2003/0010545 | A1 | * | 1/2003 | Takeuchi | ...................... 180/6.28 |
| 2004/0108769 | A1 | * | 6/2004 | Marathe | ............................ 303/2 |
| 2005/0023895 | A1 | * | 2/2005 | Yasutake et al. | .............. 303/146 |
| 2006/0204347 | A1 | * | 9/2006 | Waldbauer et al. | ........... 410/156 |
| 2006/0259225 | A1 | * | 11/2006 | Ono et al. | ....................... 701/82 |
| 2009/0133951 | A1 | * | 5/2009 | Schultz | ............... B60W 10/103 |
| | | | | | 180/307 |
| 2009/0314571 | A1 | * | 12/2009 | Fausch | ................... B60K 17/10 |
| | | | | | 180/305 |
| 2012/0029772 | A1 | * | 2/2012 | Fujita et al. | ...................... 701/41 |
| 2013/0047568 | A1 | * | 2/2013 | Yamada et al. | ................. 56/14.7 |
| 2013/0253793 | A1 | * | 9/2013 | Lee et al. | ........................ 701/70 |

FOREIGN PATENT DOCUMENTS

| JP | 4825668 | B2 | 11/2011 |
| WO | 2006038309 | A1 | 4/2006 |

* cited by examiner

Primary Examiner — Tuan C. To
(74) Attorney, Agent, or Firm — McDonnell Boehnen Hulbert & Berghoff LLP

(57) ABSTRACT

Methods and systems for steering-based oscillatory braking are described herein. A method may involve making a determination, by a computing device, to reduce a speed of a vehicle. The vehicle may include a pair of wheels. The method may further involve providing instructions to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle.

17 Claims, 9 Drawing Sheets

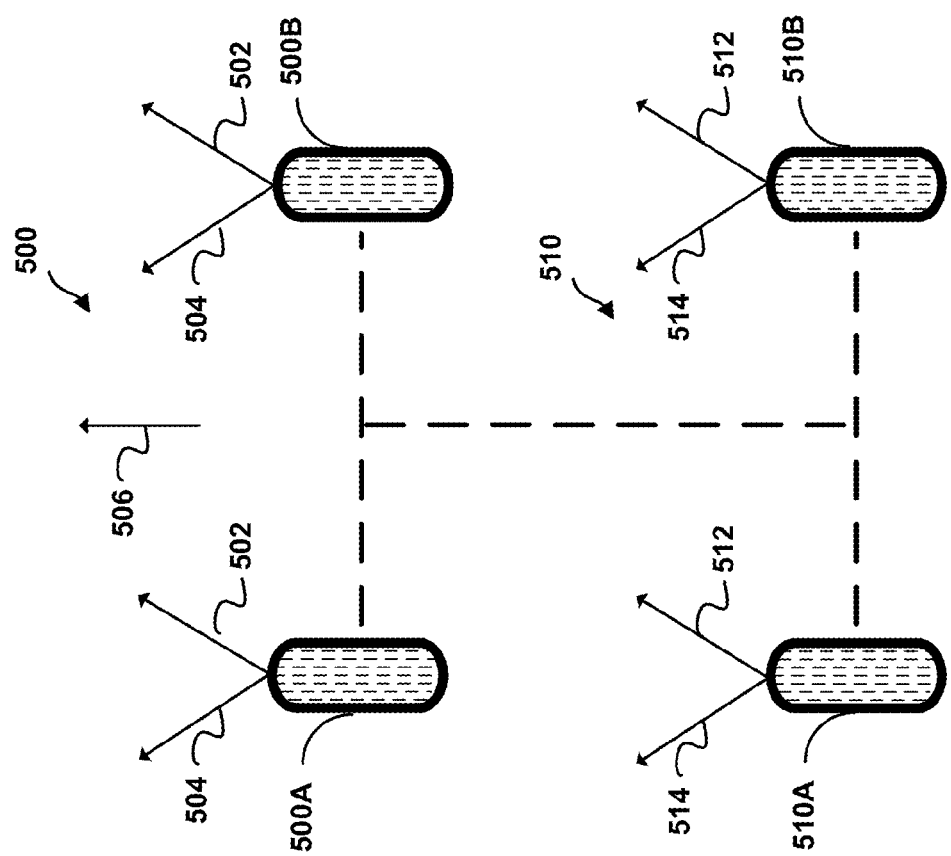

METHODS AND SYSTEMS FOR STEERING-BASED OSCILLATORY VEHICLE BRAKING

BACKGROUND

Unless otherwise indicated herein, the materials described in this section are not prior art to the claims in this application and are not admitted to be prior art by inclusion in this section.

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used when the system has been engaged, which permits the operator to switch from a manual mode (where the operator exercises a high degree of control over the movement of the vehicle) to an autonomous mode (where the vehicle essentially drives itself) to modes that lie somewhere in between.

When navigating within an environment, a vehicle may need to reduce speed or stop for numerous reasons, such as to avoid collisions or in order to properly follow speed limits. Vehicles typically slow down and stop through the utilization of a braking system. A braking system may involve friction brakes, which are a type of automotive brakes that slow or stop a vehicle by converting kinetic energy into heat energy, via friction. The heat energy dissipates into the atmosphere as the vehicle reduces speed from the loss of kinetic energy. Some vehicles may include anti-lock braking systems (ABS) that allow the wheels on a motor vehicle to maintain tractive contact with the road surface while braking. Anti-lock braking prevents wheels from locking up and avoids uncontrolled skidding of the vehicle.

SUMMARY

The present disclosure discloses embodiments that relate to methods and system for steering-based oscillatory braking.

In one example, the present disclosure describes a method. The method may comprise making a determination, by a computing device, to reduce a speed of a vehicle, wherein the vehicle includes a pair of wheels. The method may further comprise providing instructions to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle.

In another example, the present disclosure describes a system. The system may comprise at least one processor. The system may further comprise a memory having stored thereon instructions that, upon execution by the at least one processor, cause the system to perform functions. The functions may comprise making a determination to reduce a speed of a vehicle, wherein the vehicle includes a pair of wheels. The functions may further comprise providing instructions to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle.

In another example, the present disclosure describes a non-transitory computer readable medium having stored thereon executable instructions that, upon execution by a computing device, cause the computing device to perform functions. The functions may comprise making a determination to reduce a speed of a vehicle, wherein the vehicle includes a pair of wheels. The functions may further comprise providing instructions to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle.

In yet another example, the present disclosure describes another system. The system may comprise means for making a determination to reduce a speed of a vehicle, wherein the vehicle includes a pair of wheels. The system may further comprise means for providing instructions to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5B is another conceptual illustration of example steering-based oscillatory braking.

DETAILED DESCRIPTION

The following detailed description describes various features and functions of the disclosed methods and systems with reference to the accompanying figures. In the figures, similar symbols identify similar components, unless context dictates otherwise. The illustrative method and system embodiments described herein are not meant to be limiting. It may be readily understood that certain aspects of the disclosed methods and systems can be arranged and combined in a wide variety of different configurations, all of which are contemplated herein.

Within examples, an autonomous vehicle may be configured to reduce speed or stop through the use of steering-based oscillatory braking. In example implementations, a computing device associated with the autonomous vehicle may be configured to determine if the vehicle should reduce speed or stop. In some instances, in order to determine if the vehicle should reduce speed or stop, the computing device may use information that is received from one or more sensors or systems associated with the vehicle.

In some examples, the computing device may make a determination to reduce a speed of the vehicle, and in response, the computing device may cause a pair of wheels of the vehicle (e.g., front or rear wheels) to turn in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle. Beneficially, such oscillation may create friction that can reduce the speed of the vehicle or cause the vehicle to come to a stop.

Moreover, in some examples, the computing device may cause a steering wheel to decouple from a pair of wheels, such that the steering wheel does not rotate in response to the pair of wheels being turned in an oscillatory manner.

Further, in some examples, the computing device may further cause a second pair of wheels of the vehicle to turn in a second oscillatory manner, such that each wheel of the second pair of wheels is turned in substantially the same direction and turning of the second pair of wheels oscillates each wheel of the second pair of wheels between given directions about the direction of travel of the vehicle so as to reduce the speed of the vehicle.

Example systems within the scope of the present disclosure will now be described in greater detail. Generally, an example system may be implemented in or may take the form of an automobile. However, an example system may also be implemented in whole or in part or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

I. Example Vehicle

Figure 1:
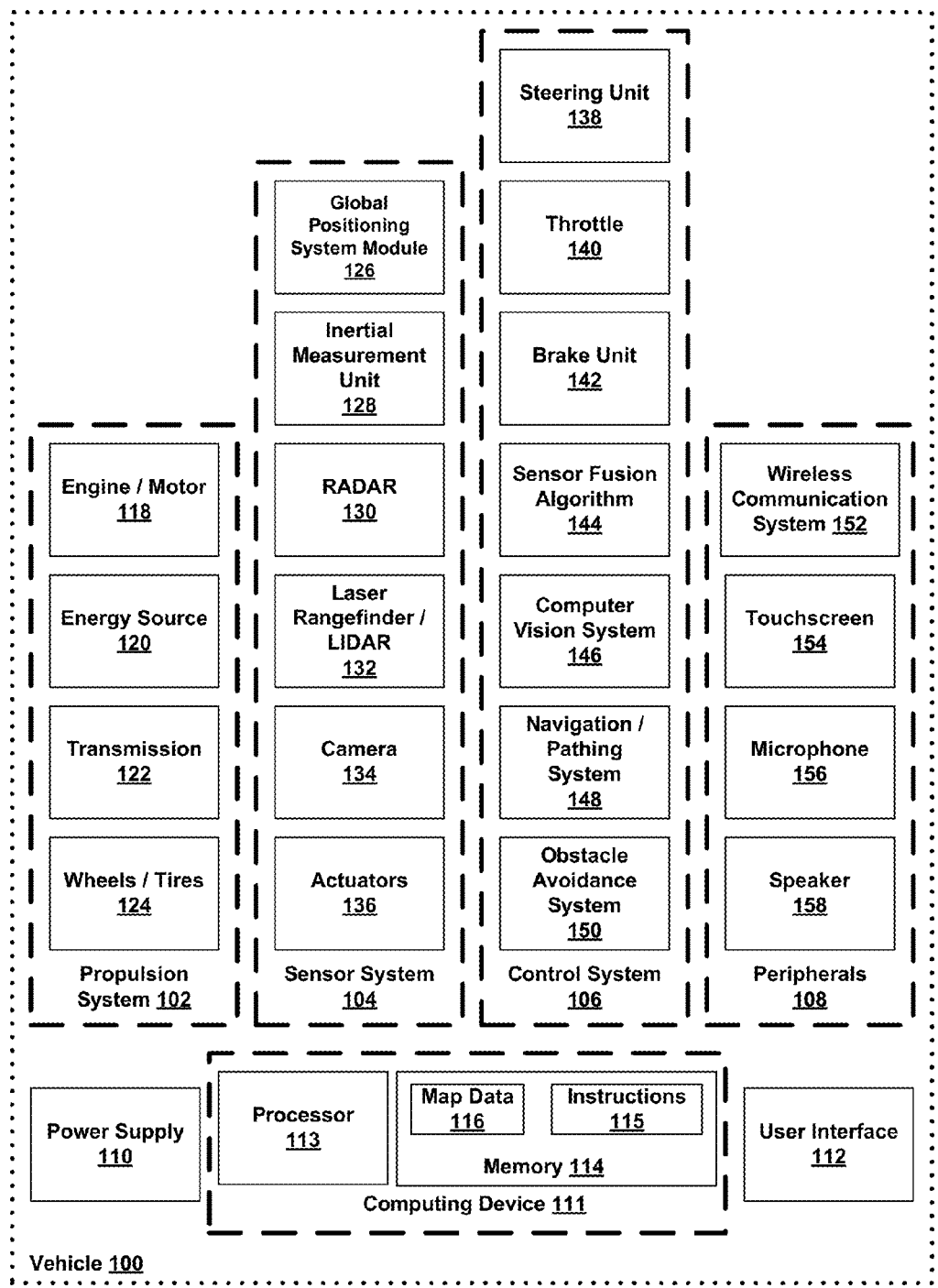
FIG. 1 is a simplified block diagram of an example vehicle, in accordance with an example embodiment.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors configured to sense information about the wheels/tires 124, sensors configured to sense information about the brake unit 142, and/or sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be traveling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or UV light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. Further, in some examples, the brake unit 142 may include one or more components that use friction to slow the wheel/tires 124 and one or more other components that may be configured to be regenerative and covert at least some of the kinetic energy of the wheels/tires 124 to electric current. And in some examples, the brake unit 142 may include an ABS. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well.

The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The vehicle 100 could include a variety of other components and/or systems as well. As one example, the vehicle 100 may be equipped with electronic stability control (ESC) that may improve the safety of the vehicle by selectively applying the brakes of one or more of the wheels in order to help navigate the vehicle in an intended path. As another example, the vehicle 100 may include Automatic Cruise Control (ACC).

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
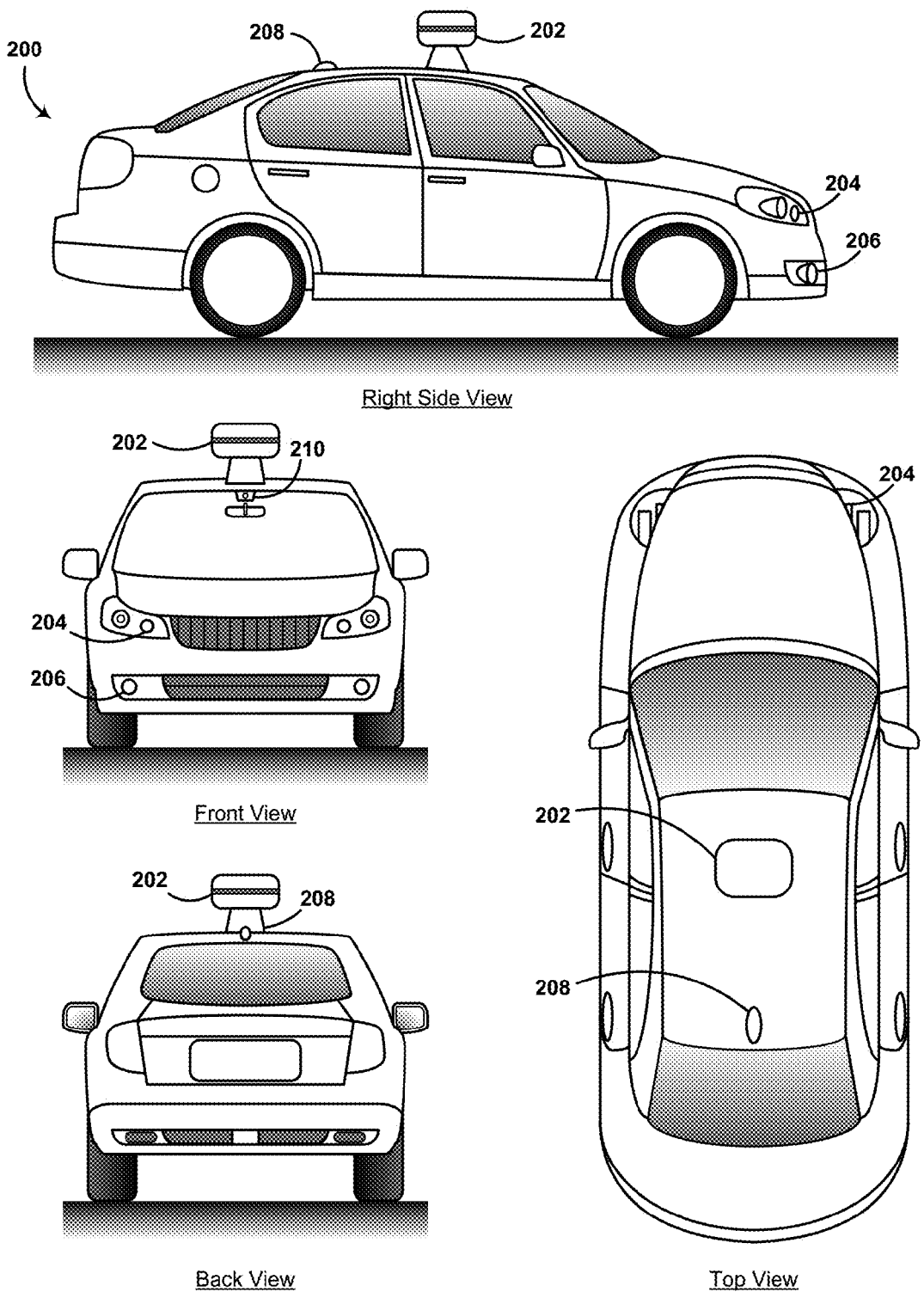
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202-206 are shown to be mounted in particular locations on the vehicle 200, in some examples the sensor units 202-206 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Although vehicle 100 and vehicle 200 have been described above, it should be understood that any vehicle that has a controller or computer-actuated brakes may implement steering-based oscillatory braking as described herein.

II. Example Methods

Figure 3:
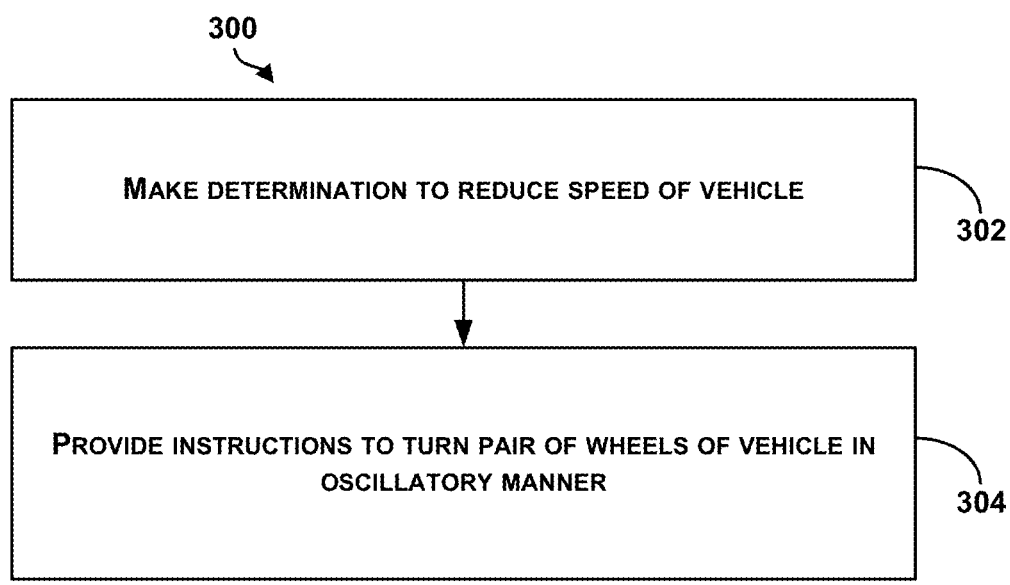
FIG. 3 is a flow chart of an example method for implementing steering-based oscillatory braking.

FIG. 3 is a flow chart of an example method 300 for implementing steering-based oscillatory braking. The method 300 may include one or more operations, functions, or actions as illustrated by one or more blocks 302-304. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes making a determination, by a computing device, to reduce a speed of a vehicle. The vehicle may include a pair of wheels. In some examples, the computing device may utilize information received from various systems associated with the vehicle, such as RADAR, LIDAR, GPS, accelerometers, gyroscopes, or other sensors, to make a determination to reduce a speed of a vehicle. A vehicle may be configured to receive information from multiple systems simultaneously. The information received from the various sensors and systems of the vehicle may include details about the environment surrounding the vehicle, including information about determined distances and/or ranges between the vehicle and possible on-coming obstacles or other entities in the surrounding environment. The information obtained from systems of the vehicle may provide the computing device with assistance for determining an amount of braking to be applied and an overall timing to apply such braking.

In some implementations, the computing device may receive an input and make a determination to reduce a speed of the vehicle based on the received input. For example, the computing device may receive an input from a brake pedal, a joystick, and/or a button and make the determination to reduce the speed of the vehicle based on the received input. In some instances, the input received by the computing device from the brake pedal, joystick, and/or button may indicate that the vehicle should reduce speed or stop. The brake pedal could be part of a primary braking system of the vehicle. And the button and/or joystick could be located either inside or outside the vehicle.

In some implementations, a computing device may receive information in real-time for making a determination to reduce a speed of a vehicle. In addition, a vehicle may be configured to make the determination to reduce speed through the assistance of a network or other communication with other objects. For example, a stop signal may transmit a signal to a vehicle that alerts the vehicle to reduce speed or stop. The example situations described herein serve merely as illustrations and are not limiting.

In some examples, rather than a computing device operating the vehicle autonomously, a network of computing devices may be configured to cooperatively operate the various systems of the vehicle and make a determination that the vehicle should reduce speed or stop. Other examples may exist as well.

At block 304, the method 300 further includes providing instructions to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce speed of the vehicle. A computing device of a vehicle may provide instructions to a system or systems of the vehicle that executes the instructions and repositions of one or more wheels to initiate steering-based oscillatory braking. Various mechanical or electronic systems may be utilized to execute steering-based oscillatory braking.

In some examples, turning the pair of wheels in an oscillatory manner may involve one or more oscillation cycles. And in such examples, a particular oscillation cycle of the one or more oscillation cycles may involve turning each wheel of the pair of wheels to a first direction, turning each wheel of the pair of wheels to a second direction, and turning each wheel of the pair of wheels to the first direction.

In some implementations, the first and second direction may each be a direction away from parallel to a direction of travel of the vehicle. For example, when the pair of wheels is turned to the first direction, a first wheel of the pair of wheels may point inwards toward a direction of travel of the vehicle at an angle away from parallel to the direction of travel of the vehicle, and a second wheel of the pair of wheels may point outwards away from the direction of travel of the vehicle at the angle away from parallel to the direction of travel of the vehicle. And in such an example, when the pair of wheels is turned to the second direction, the first wheel of the pair of wheels may point outwards away from the direction of travel of the vehicle at an angle away from parallel to the direction of travel the vehicle, and the second wheel of the pair of wheels may point inwards toward the direction of travel of the vehicle at the angle away from parallel to the direction of travel of the vehicle.

In another implementation, a first wheel of a pair of wheels may be turned to a first direction, and a second wheel of the pair of wheels may be turned to a direction that is substantially the same as the first direction. For example, when the first wheel of the pair of wheels is turned to the first direction and the second wheel of the pair of wheels is turned to the direction that is substantially the same as the first direction, the first wheel of the pair of wheels may point inwards toward a direction of travel of the vehicle at an angle away from parallel to the direction of travel of the vehicle, and the second wheel of the pair of wheels may point outwards away from the direction of travel of the vehicle at an angle away from parallel to the direction of travel of the vehicle that is substantially the same as the angle away from parallel to the direction of travel of the vehicle. The term "substantially the same," as used in this disclosure, may refer to exactly the same and/or one or more deviations from exactly the same that do not significantly impact steering-based oscillatory braking as described herein.

In yet another implementation, a first wheel of a pair of wheels may be turned to a second direction, and a second wheel of the pair of wheels may be turned to a direction that is substantially the same as the second direction. For example, when the first wheel of the pair of wheels is turned to the second direction and the second wheel of the pair of wheels is turned to the direction that is substantially the same as the second direction, the first wheel of the pair of wheels may point outwards away from the direction of travel of the vehicle at an angle away from parallel to the direction of travel the vehicle, and the second wheel of the pair of wheels may point inwards toward the direction of travel of the vehicle at an angle away from parallel to the direction of travel of the vehicle that is substantially the same as the angle away from parallel to the direction of travel of the vehicle.

In some implementations, an angle away from parallel to a direction of travel of the vehicle may represent a measurement of how much each wheel of the pair of wheels points in or out from a straight-ahead position. The angle away from parallel to a direction of travel of the vehicle may be measured in millimeters, inches, or degrees, etc. And, in some embodiments, the angle away from parallel to a direction of travel of the vehicle may be referred to as a slip angle and/or toe.

In some examples, providing instructions to turn a pair of wheels of the vehicle may include determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle; determining an angle away from parallel to the direction of travel of the vehicle at which to turn the pair of wheels based at least in part on the one or more parameters; and providing instructions to turn the pair of wheels at the angle. The computing device may utilize information received from various systems associated with the vehicle, such as RADAR, LIDAR, GPS, accelerometers, gyroscopes, or other sensors, to determine the one or more parameters.

In some examples, the steering angle may be an angle between midplanes of a pair of wheels (e.g., front or rear wheels) of the vehicle and a centerline of the vehicle. And in such examples, when the vehicle is traveling in a corner and braking is desired, providing instructions to turn the pair of wheels at the steering angle may help to maintain the vehicle's travel in the corner.

In some examples, the vehicle may include one or more deceleration systems. The one or more deceleration systems may include various mechanisms configured to decelerate the vehicle. For instance, at least one deceleration system may use friction to slow at least one pair of wheels (e.g., front or rear wheels). In addition, at least one deceleration system may be configured to be regenerative and convert at least some of the kinetic energy of at least one pair of wheels to electric current. Any or all of the deceleration systems of the one or more deceleration systems may take the form of or be similar in form to the brake unit 142.

Further, in some examples, an operational status of a deceleration system may indicate whether the deceleration system may contribute to reducing speed or stopping the vehicle. And in some examples, a deceleration contribution of the deceleration system may be an amount of deceleration that the deceleration system may contribute to reducing speed or stopping the vehicle.

As noted, turning the pair of wheels in an oscillatory manner may involve one or more oscillation cycles. In some examples, the computing device may determine an angle away from parallel to a direction of travel of the vehicle for the one or more oscillation cycles. For instance, the computing device may determine the angle away from parallel to a direction of travel of the vehicle before turning the pair of wheels in an oscillatory manner. With this arrangement, the angle away from parallel to a direction of travel of the vehicle may be substantially the same (e.g., have substantially the same value) for some or all oscillation cycles of the one or more oscillation cycles. As a result, the first direction may be substantially the same for some or all oscillation cycles of the one or more oscillation cycles, and the second direction may be substantially the same for some or all oscillation cycles of the one or more oscillation cycles.

In another example, the computing device may determine an angle away from parallel to a direction of travel for each oscillation cycle of the one or more oscillation cycles. For instance, the computing device may determine the angle away from parallel to a direction of travel of the vehicle at the beginning or end of a particular oscillation cycle or during the particular oscillation cycle. With this arrangement, the angle away from parallel to a direction of travel of the vehicle may be different (e.g., have a different value) for some or all oscillation cycles of the one or more oscillation cycles. As a result, the first direction may be different for some or all oscillation cycles of the one or more oscillation cycles, and the second direction may be different for some or all oscillation cycles of the one or more oscillation cycles.

For example, in a scenario where the one or more oscillation cycles comprises a first oscillation cycle and a second oscillation cycle, an angle away from parallel to a direction of travel of the vehicle for the first oscillation cycle may be greater (or less) than an angle away from parallel to a direction of travel of the vehicle for the second oscillation cycle (and consequently the first and second directions for the first oscillation cycle may be different than the first and second directions for the second oscillation cycle).

In some examples, turning the pair of wheels in an oscillatory manner may involve turning the pair of wheels at a frequency of oscillation. And in some examples, a frequency of oscillation may represent a measurement of the number of oscillation cycles the pair of wheels is turned for a given time period. The frequency of oscillation may be measured in hertz.

In some embodiments, providing instructions to turn a pair of wheels of the vehicle may include determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle; determining a frequency of oscillation of the pair of wheels based at least in part on the one or more parameters; and providing instructions to turn the pair of wheels at the frequency of oscillation. As noted, the computing device may utilize information received from various systems associated with the vehicle, such as RADAR, LIDAR, GPS, accelerometers, gyroscopes, or other sensors, to determine the one or more parameters.

As noted, turning the pair of wheels in an oscillatory manner may involve one or more oscillation cycles. In some examples, the computing device may determine a frequency of oscillation for the one or more oscillation cycles. For instance, the computing device may determine the frequency of oscillation before turning the pair of wheels in an oscillatory manner. With this arrangement, the frequency of oscillation may be substantially the same (e.g., have substantially the same value) for some or all oscillation cycles of the one or more oscillation cycles.

In another example, the computing device may determine a frequency of oscillation for each oscillation cycle of the one or more oscillation cycles. For instance, the computing device may determine the frequency of oscillation at the beginning or end of a particular oscillation cycle or during the particular oscillation cycle. With this arrangement, the frequency of oscillation may be different (e.g., have a different value) for some or all oscillation cycles of the one or more oscillation cycles. For example, in a scenario where the one or more oscillation cycles comprises a first oscillation cycle and a second oscillation cycle, a frequency of oscillation for the first oscillation cycle may be greater (or less) than a frequency of oscillation for the second oscillation cycle.

In some examples, the method 300 may further involve making a determination, by the computing device, that a primary braking system of the vehicle has failed, wherein making a determination to reduce a speed of a vehicle is based at least in part on failure of the primary braking system. In such examples, the primary braking system may take the form of or be similar in form to the brake unit 142. Moreover, in such examples when the vehicle includes one or more deceleration systems, at least one deceleration system may be the primary braking system. Further, in some examples, one or more components, or systems of the vehicle, such as an ABS, ESC, and/or an ACC, may assist in making the determination that the primary braking system of the vehicle has failed.

In some examples, when the primary braking system cannot reduce the speed of the vehicle or stop the vehicle and/or cannot reduce the speed of the vehicle or stop the vehicle within a predetermined braking distance and/or a predetermined time period, the primary braking system may have failed. In some situations, when the primary braking system has failed, the primary braking system may not respond and/or respond inadequately to one or more instructions or commands from a driver of the vehicle and/or a computing device.

In some examples, the computing device may utilize information received from various systems associated with the vehicle, such as RADAR, LIDAR, GPS, accelerometers, gyroscopes, or other sensors, to make a determination that a primary braking system has failed. The information received from the various sensors and systems of the vehicle may include details about the primary braking system.

In some implementations, a computing device may receive information in real-time for making a determination that a primary braking system has failed. In addition, a vehicle may be configured to make the determination that a primary braking system has failed through the assistance of a network or other communication with other objects. For example, a traffic signal may transmit a signal to a vehicle that alerts the vehicle that the primary braking system has failed. Other examples may exist as well.

In some examples, rather than a computing device operating the vehicle autonomously, a network of computing devices may be configured to cooperatively operate the various systems of the vehicle and make a determination that a primary braking system of the vehicle has failed. Other examples may exist as well.

In some examples, the method 300 may further involve providing instructions to decouple a steering wheel of the vehicle from the pair of wheels, such that the steering wheel does not rotate in response to the pair of wheels being turned in an oscillatory manner. As a result, the steering wheel may not contact a driver of the vehicle when the pair of wheels is turned in an oscillatory manner. With this arrangement, safety of the driver may be improved. (Of course, in some examples, the vehicle might not include a steering wheel).

The steering wheel may be decoupled from the pair of wheels in a variety of ways. For example, the steering wheel may be electrically decoupled from the pair of wheels. In another example, the steering wheel may be mechanically decoupled from the pair of wheels.

In some examples, rotation of a steering wheel of the vehicle may be independent of turning of the pair of wheels in an oscillatory manner. As a result, the steering wheel may not rotate when the pair of wheels is turned in an oscillatory manner. With this arrangement, safety of a driver of the vehicle may be improved. Additionally, in such examples, the vehicle may receive a desired direction of travel from the steering wheel when the pair of wheels is turned in an oscillatory manner. With this arrangement, a driver may navigate the vehicle when the pair of wheels is turned in an oscillatory manner.

In some examples, the vehicle may include a second pair of wheels, and the method 300 may further involve providing instructions to turn the second pair of wheels of the vehicle in a second oscillatory manner, such that each wheel of the second pair of wheels is turned in substantially the same direction and turning the second pair of wheels oscillates each wheel of the second pair of wheels between given directions about the direction of travel of the vehicle so as to reduce the speed of the vehicle.

The oscillatory manner and the second oscillatory manner may take various different embodiments in various different forms. For instance, in some examples, providing instructions to turn the pair of wheels and providing instructions to turn the second pair of wheels may cause the pair of wheels and the second pair of wheels to synchronously oscillate between given directions about the direction of travel of the vehicle.

However, in other examples, providing instructions to turn the pair of wheels and providing instructions to turn the second pair of wheels might not cause the pair of wheels and the second pair of wheels to synchronously oscillate between given directions about the direction of travel of the vehicle. For instance, in some examples, providing instructions to turn the pair of wheels and providing instructions to turn the second pair of wheels may cause the pair of wheels and the second pair of wheels to asynchronously oscillate between given directions about the direction of travel of the vehicle.

Moreover, in some implementations, an oscillation of each wheel of the pair of wheels between given directions about a direction of travel of the vehicle may be in-phase with an oscillation of each wheel of the second pair of wheels between given directions about the direction of travel of the vehicle. However, in other implementations, an oscillation of each wheel of the pair of wheels between given directions about a direction of travel of the vehicle may be out-of-phase with an oscillation of each wheel of the second pair of wheels between given directions about the direction of travel of the vehicle.

In some examples, turning the second pair of wheels in a second oscillatory manner may involve one or more second oscillation cycles. And in such examples, a particular second oscillation cycle of the one or more second oscillation cycles may involve turning each wheel of the second pair of wheels to a third direction, turning each wheel of the pair of wheels to a fourth direction, and turning each wheel of the pair of wheels to the third direction.

In some implementations, the third and fourth direction may each be a direction away from parallel to a direction of travel of the vehicle. For example, when the second pair of wheels is turned to the third direction, a first wheel of the second pair of wheels may point inwards toward a direction of travel of the vehicle at a second angle away from parallel to the direction of travel the vehicle, and a second wheel of the second pair of wheels may point outwards away from the direction of travel of the vehicle at the second angle away from parallel to the direction of travel of the vehicle. And in such an example, when the second pair of wheels is turned to the fourth direction, the first wheel of the second pair of wheels may point outwards away from the direction of travel of the vehicle at a second angle away from parallel to the direction of travel the vehicle, and the second wheel of the pair of wheels may point inwards toward the direction of travel of the vehicle at the second angle away from parallel to the direction of travel of the vehicle.

In some implementations, the third direction may be substantially the same as the first direction, and/or the fourth direction may be substantially the same as the second direction. However, in other implementations, the third direction may be different than the first direction, and/or the fourth direction may be different than the second direction.

In another implementation, a first wheel of a second pair of wheels may be turned to a third direction, and a second wheel of the second pair of wheels may be turned to a direction that is substantially the same as the third direction. For example, when the first wheel of the second pair of wheels is turned to the third direction and the second wheel of the pair of wheels is turned to the direction that is substantially the same as the third direction, the first wheel of the second pair of wheels may point inwards toward a direction of travel of the vehicle at a second angle away from parallel to the direction of travel of the vehicle, and the second wheel of the second pair of wheels may point outwards away from the direction of travel of the vehicle at an angle away from parallel to the direction of travel of the vehicle that is substantially the same as the second angle away from parallel to the direction of travel of the vehicle.

In yet another implementation, a first wheel of a second pair of wheels may be turned to a fourth direction, and a second wheel of the pair of wheels may be turned to a direction that is substantially the same as the fourth direction. For example, when the first wheel of the second pair of wheels is turned to the fourth direction and the second wheel of the second pair of wheels is turned to the direction that is substantially the same as the fourth direction, the first wheel of the second pair of wheels may point outwards away from the direction of travel of the vehicle at a second angle away from parallel to the direction of travel the vehicle, and the second wheel of the second pair of wheels may point inwards toward the direction of travel of the vehicle at an angle away from parallel to the direction of travel of the vehicle that is substantially the same as the second angle away from parallel to the direction of travel of the vehicle.

In some implementations, the second angle away from parallel to a direction of travel of the vehicle may represent a measurement of how much each wheel of the second pair of wheels points in or out from a straight-ahead position. The second angle away from parallel to a direction of travel of the vehicle may be measured in millimeters, inches, or degrees, etc. And, in some embodiments, the second angle away from parallel to a direction of travel of the vehicle may be referred to as a slip angle and/or toe.

In some examples, providing instructions to turn a second pair of wheels of the vehicle may include determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle; determining a second angle away from parallel to the direction of travel of the vehicle at which to turn the second pair of wheels based at least in part on the one or more parameters; and providing instructions to turn the second pair of wheels at the second angle. As noted, the computing device may utilize information received from various systems associated with the vehicle, such as RADAR, LIDAR, GPS, accelerometers, gyroscopes, or other sensors, to determine the one or more parameters.

As noted, turning the second pair of wheels in a second oscillatory manner may involve one or more second oscillation cycles. In some examples, the computing device may determine a second angle away from parallel to a direction of travel of the vehicle for the one or more second oscillation cycles. For instance, the computing device may determine the second angle away from parallel to a direction of travel of the vehicle before turning the second pair of wheels in a second oscillatory manner. With this arrangement, the second angle away from parallel to a direction of travel of the vehicle may be substantially the same (e.g., have substantially the same value) for some or all second oscillation cycles of the one or more second oscillation cycles. As a result, the third direction may be substantially the same for some or all second oscillation cycles of the one or more second oscillation cycles, and the fourth direction may be substantially the same for some or all second oscillation cycles of the one or more second oscillation cycles.

In another example, the computing device may determine a second angle away from parallel to a direction of travel for each second oscillation cycle of the one or more second oscillation cycles. For instance, the computing device may determine the second angle away from parallel to a direction of travel of the vehicle at the beginning or end of a particular second oscillation cycle or during the particular second oscillation cycle. With this arrangement, the second angle away from parallel to a direction of travel of the vehicle may be different (e.g., have a different value) for some or all second oscillation cycles of the one or more second oscillation cycles. As a result, the third direction may be different for some or all second oscillation cycle of the one or more second oscillation cycles, and the fourth direction may be different for some or all second oscillation cycles of the one or more second oscillation cycles.

For example, in a scenario where the one or more second oscillation cycles comprises a third second oscillation cycle and a fourth second oscillation cycle, a second angle away from parallel to a direction of travel of the vehicle for the third second oscillation cycle may be greater (or less) than a second angle away from parallel to a direction of travel of the vehicle for the fourth second oscillation cycle (and consequently the third and fourth directions for the third second oscillation cycle may be different than the third and fourth directions for the fourth second oscillation cycle).

In some implementations, the second angle away from parallel to the direction of travel of the vehicle may be substantially the same (e.g., have substantially the same value) as the angle away from parallel to a direction of travel of the vehicle. However, in other implementations, the second angle away from parallel to the direction of travel of vehicle may be different (e.g., have a different value) than the angle away from parallel to a direction of travel of the vehicle. For example, the second angle away from parallel to the direction of travel of the vehicle may be greater (or less) than the angle away from parallel to a direction of travel of the vehicle.

In some examples, turning the second pair of wheels in a second oscillatory manner may involve turning the second pair of wheels at a second frequency of oscillation. And in some examples, a second frequency of oscillation may represent a measurement of the number of second oscillation cycles the second pair of wheels is turned for a given time period. The second frequency of oscillation may be measured in hertz.

In some embodiments, providing instructions to turn a second pair of wheels of the vehicle may include determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle; determining a second frequency of oscillation of the second pair of wheels based at least in part on the one or more parameters; and providing instructions to turn the second pair of wheels at the second frequency of oscillation. As noted, the computing device may utilize information received from various systems associated with the vehicle, such as RADAR, LIDAR, GPS, accelerometers, gyroscopes, or other sensors, to determine the one or more parameters.

As noted above, turning the second pair of wheels in a second oscillatory manner may involve one or more second oscillation cycles. In some examples, the computing device may determine a second frequency of oscillation for the one or more second oscillation cycles. For instance, the computing device may determine the second frequency of oscillation before turning the second pair of wheels in a second oscillatory manner. With this arrangement, the second frequency of oscillation may be substantially the same (e.g., have substantially the same value) for some or all second oscillation cycles of the one or more second oscillation cycles.

In another example, the computing device may determine a second frequency of oscillation for each second oscillation cycle of the one or more second oscillation cycles. For instance, the computing device may determine the second frequency of oscillation at the beginning or end of a particular second oscillation cycle or during the particular second oscillation cycle. With this arrangement, the second frequency of oscillation may be different (e.g., have a different value) for some or all second oscillation cycles of the one or more second oscillation cycles. For example, in a scenario where the one or more oscillation cycles comprises a third second oscillation cycle and a fourth second oscillation cycle, a second frequency of oscillation for the third second oscillation cycle may be greater (or less) than a frequency of oscillation for the fourth second oscillation cycle.

In some implementations, the second frequency of oscillation may be substantially the same (e.g., have substantially the same value) as the frequency of oscillation. However, in other implementations, the second frequency of oscillation may be different (e.g., have a different value) than the frequency of oscillation. For example, the second frequency of oscillation may be greater (or less) than the frequency of oscillation.

In some examples, the method 300 may further involve providing instructions to decouple a steering wheel of the vehicle from the second pair of wheels, such that the steering wheel does not rotate in response to the second pair of wheels being turned in a second oscillatory manner. As a result, the steering wheel may not contact a driver of the vehicle when the second pair of wheels is turned in a second oscillatory manner. With this arrangement, safety of the driver may be improved.

The steering wheel may be decoupled from the second pair of wheels in a variety of ways. For example, the steering wheel may be electrically decoupled from the second pair of wheels. In another example, the steering wheel may be mechanically decoupled from the second pair of wheels.

In some examples, rotation of a steering wheel of a vehicle may be independent of turning of the second pair of wheels in a second oscillatory manner. As a result, the steering wheel may not rotate when the second pair of wheels is turned in a second oscillatory manner. With this arrangement, safety of a driver of the vehicle may be improved. Additionally, in such examples, the vehicle may receive a desired direction of travel from the steering wheel when the second pair of wheels is turned in a second oscillatory manner. With this arrangement, a driver may navigate the vehicle when the second pair of wheels is turned in a second oscillatory manner.

In one example, a vehicle may determine that an immediate reduction in speed is necessary to prevent a collision or another immediate hazard. Similarly, the computing device may receive information from sensors associated with the vehicle about other environmental elements that may cause the computing device to reduce the speed or stop the vehicle. Other environmental elements may include, but are not limited to, speed limits, street signs, weather conditions, vehicles or other physical objects, and pedestrians. For example, the computing device may determine that the vehicle should reduce speed or stop in response to detecting ice on the roads, a rainy environment, or similar weather conditions.

In one example implementation, a computing device may further determine that the vehicle should apply braking, such as steering-based oscillatory braking, in a manner that causes the vehicle to travel in a specific direction while slowing down. For example, a computing device may recognize an obstacle in the path of travel is quickly approaching and in response, determine that the vehicle should apply the brakes and reduce speed or stop in a direction that avoids the obstacle. A vehicle may be capable of reducing speed or stopping in a specific direction as a result of applying braking.

In some implementations, the computing device may first determine that the vehicle should be slowed down initially, but then make a further determination that the vehicle should be completely stopped. The computing device controlling a vehicle may be configured to constantly monitor situations to make adjustments even in the middle of applying braking. For example, a computing device may determine that only one pair wheels (e.g., front pair of wheels) of a vehicle should apply steering-based oscillatory braking, but then determine during the slowing down process, based on changed conditions, that a second pair of wheels (e.g., rear pair of wheels) should also apply steering-based oscillatory braking as well.

III. Example Implementations

FIGS. 4A-4D illustrate example conceptual illustrations of mechanical structures for implementing steering-based oscillatory braking. The various example mechanical structures may be part of a vehicle, such as vehicle 100 and vehicle 200. In other examples, vehicles may utilize other structures capable of implementing steering-based oscillatory braking as well.

In some implementations, the mechanical structures shown within FIGS. 4A-4D may be linked to other structures that receive instructions to apply oscillatory braking. Within the other structure, additional electrical or mechanical components may be included. In other implementations, other mechanical or electronic structures for steering-based oscillatory braking may exist as well.

To execute steering-based oscillatory braking, various systems may be capable of turning a pair of wheels in an oscillatory manner. A vehicle may utilize one or more systems, including but not limited to the brake system, emission system, engine, transmission, steering and suspension, filters and fluids, or other systems to implement steering-based oscillatory braking.

In some implementations, electronic components may be utilized to turn (or reposition) any wheels of a vehicle to induce steering-based oscillatory braking. During execution, mechanical and electronic structures may work cooperatively or systematically in order to execute steering-based oscillatory braking to reduce a speed of a vehicle or stop the vehicle. Such an arrangement may ensure safe vehicle control and operation under a wide variety of conditions.

Figure 4A:
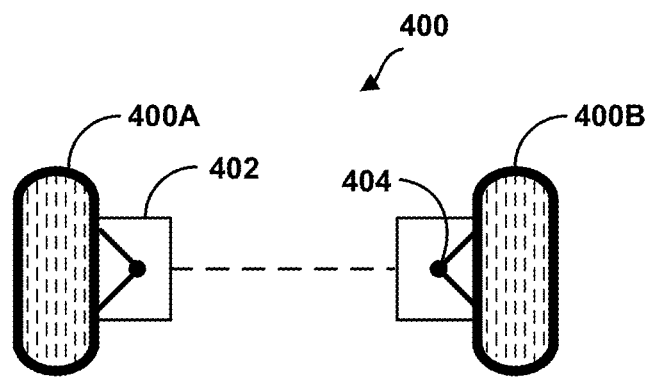
FIG. 4A is a conceptual illustration of an example mechanical structure for implementing steering-based oscillatory braking.

FIG. 4A illustrates an example conceptual illustration of a mechanical structure for implementing steering-based oscillatory braking, which includes independent steering actuators on each wheel. The example shown FIG. 4A includes only a small portion of a vehicle displaying possible pair of wheels 400, steering actuators including a steering actuator 402, and pivots including a pivot 404. The pair of wheels 400 includes a first wheel 400A and a second wheel 400B. The mechanical structure shown in FIG. 4A may be a minor portion of a larger structure capable of implementing steering-based oscillatory braking. A vehicle equipped with independent steering actuators on each wheel, as shown in FIG. 4A, may be capable of turning wheels individually in various combinations to induce steering-based oscillatory braking.

The first wheel 400A may represent any of the wheels of a vehicle and may connect to other wheels via axles. For example, in a traditional four-wheel vehicle, the wheel 400A may represent any of the four wheels. Similarly, the first wheel 400A may additionally represent other entities of a vehicle, including navigational portions of a boat or other structures on other modes of transportation. The second wheel 400B may take the form of or be similar in form to the first wheel 400A.

In implementations, a wheel may be a ring-shaped covering that fits around a wheel's rim to protect the rim and enable the vehicle to travel and may be made from various materials, including but not limited to synthetic rubber, natural rubber, fabric and wire, carbon black, or other materials and/or chemical compounds. The first wheel 400A may include various types of grooves and treads to increase friction for braking and performance. In some implementations, a wheel may be equipped with special treading that further enhances steering-based oscillatory braking. Other examples of wheels may be utilized by a vehicle to execute steering-based oscillatory braking as well.

A steering actuator, such as the steering actuator 402, is a device used to assist with the steering of a vehicle. The vehicle may comprise different types of steering actuators, such as a double-ended, hydraulic ram that is able to push out both ends of the device. Various types of vehicles, such as boats, automobiles, and farm tractors, may include the use of one or more steering actuators. In some implementations, steering actuators may be configured to work with rack-and-pinion steering systems.

Pivot 404 represents possible pivots that may be utilized in a structure capable of implementing steering-based oscillatory braking. The pivots associated with each wheel may allow a vehicle to reposition the wheels in a configuration that induces friction through oscillatory braking. For example, a vehicle may move the steering pivots to keep the tie rods in their existing locations to make the wheels position in toe-in position.

In an example system, a vehicle may be configured through mechanical control of the steering system to allow steering wheels of the vehicle (e.g., front or rear wheels) to be independently controlled. The independent actuators shown in FIG. 4A may allow the vehicle to implement steering-based oscillatory braking.

In another example, a vehicle may be configured through mechanical control of the steering system to allow each wheel of a pair of wheels (e.g., the first wheel 400A and the second wheel 400B) to be controlled together. And in such an example, each wheel of the pair of wheels 400 may be controlled together by a steering actuator (which may take the form or be similar in form to the steering actuator 402). With this arrangement, the steering actuator may allow the vehicle to implement steering-based oscillatory braking.

Figure 4B:
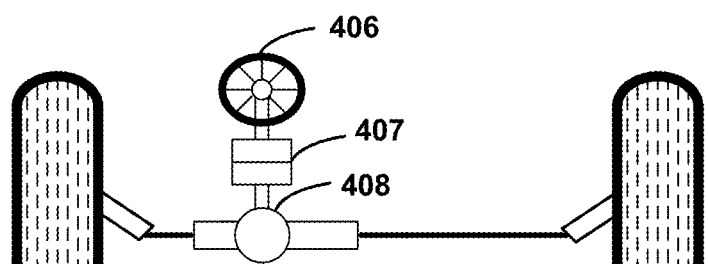
FIG. 4B is another conceptual illustration of an example mechanical structure for implementing steering-based oscillatory braking.

FIG. 4B is another example conceptual illustration of a mechanical structure for implementing steering-based oscillatory braking. The example shown in FIG. 4B includes a steering wheel 406, a decoupling unit 407, and a steering rack 408. The steering wheel 406 may be connected to the decoupling unit 407. The decoupling unit 407 may be configured to decouple the steering wheel 406 from the pair of wheels 400. As one example, the decoupling unit 407 may be configured to electrically decouple the steering wheel 406 from the pair of wheels 400. As another example, the decoupling unit 407 may be configured to mechanically decouple the steering wheel 406 from the pair of wheels 400.

The steering wheel 406 may be connected to the steering rack 408 through rack-and-pinion steering. In some examples, the steering rack 408 may be driven by an actuator, such as an electric motor or one or more hydraulic components. With this arrangement, the steering rack 408 may be commanded left and right to turn the pair of wheels 404.

The actuator could be located near the steering wheel 406 (e.g., the actuator may be located on an upstream side of the steering rack 408). In some implementations, the actuator may be independent of the steering rack 408. And in such implementations, the actuator could be located closer to the first wheel 404A than the steering wheel 406 or closer to the second wheel 404B than the steering wheel 406.

A rack-and-pinion gear set may be enclosed in a metal tube, with each end of the rack protruding from the tube. A rod, called a tie rod may connect to each end of the rack. The pinion gear may attach to the steering shaft of the steering wheel 406. A rack-and-pinion gear set may allow the conversion of rotational motion of the steering wheel 406 into the linear motion needed to turn the wheels. Similarly, it may provide a gear reduction that simplifies turning the wheels. The rack-and-pinion gear set may be modified with some changes in example implementations.

The steering wheel 406 shown in FIG. 4B may be configured to automatically execute commands related to navigation of the vehicle or steering-based oscillatory braking. In some examples, a vehicle may be configured with a single actuator for normal steering plus an additional actuator to provide an offset to one of the wheels. The additional configuration may allow the vehicle to mechanically implement steering-based oscillatory braking. An autonomous vehicle may be configured to control the direction of navigation of the vehicle through autonomous control of the steering system and/or other systems.

In another example, a vehicle may be configured with a single actuator for normal steering plus an additional actuator to provide an offset to both of the wheels. The single actuator may be configured to allow the vehicle to execute steering-based oscillatory braking. The vehicle may also be equipped with tie rods that link the wheels to the rack-and-pinion steering equipment. Other mechanical or electrical components may be included as well.

In an additional implementation for a vehicle with a traditional steering rack, the vehicle may be configured to shift the mounting point of the rack towards the left and right to execute steering-based oscillatory braking. In the case that the tie rods are angled towards the front of the vehicle, as the rack mount moves forward, the wheel rods may straighten out to effectively turn both wheels.

Figure 4C:
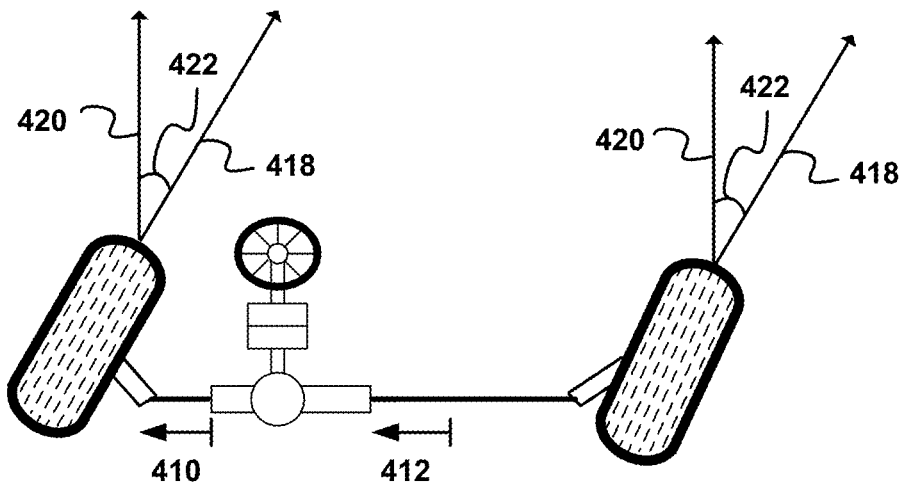
FIG. 4C is another conceptual illustration of an example mechanical structure for implementing steering-based oscillatory braking.

FIG. 4C is another example conceptual illustration of a mechanical structure for implementing steering-based oscillatory braking. The example shown in FIG. 4C illustrates different movements represented by arrows 410 and 412 that signal the changes in the structural equipment to execute turning the pair of wheels 400 to a first direction 418. As shown in FIG. 4C, when the pair of wheels 400 is turned to the first direction 418, the first wheel 400A points inwards toward a direction of travel 420 of the vehicle at an angle 422 away from parallel to the direction of travel 420 of the vehicle, and the second wheel 400B points outwards away from the direction of travel 420 of the vehicle at the angle 422 away from parallel to the direction of travel 420 of the vehicle. Other structural changes may exist as well.

Further, in other implementations, the structure shown in FIG. 4C may be altered to cause the pair of wheels to turn to a second direction. And in such an implementation, when the pair of wheels is turned to the second direction, the first wheel 400A may point outwards away from the direction of travel 420 of the vehicle at the angle 422 away from parallel to the direction of travel 420 of the vehicle, and the second wheel 400B may point inwards toward the direction of travel 420 of the vehicle at the angle 422 away from parallel to the direction of travel 420 of the vehicle.

The various movements represented by arrows 410 and 412 illustrate one possible implementation of a vehicle executing turning the pair of wheels 400 to the first direction 418. Mechanical portions of the steering system may be capable of extending or detracting in order to cause a wheel or wheels to be positioned in the first direction 418. In the example, the arrow 410 represents an extension of a tie rod extending from the rack coupled to the steering wheel. The tie rod may be capable of extending or decreasing based on movements generated through the steering system. The arrow 412 represents a tie rod extending from the rack to allow the position of the wheel to be changed. The arrows represent example movements, but other movements may also occur to allow the vehicle to execute oscillatory braking. Other movements may exist utilizing other mechanical structures as well.

In another implementation, the structure shown in FIG. 4C may be altered to cause the first wheel 400A to turn to the first direction 418, and the second wheel 400B to turn to a direction that is substantially the same as the first direction 418. And in such an implementation, when the first wheel 400A is turned to the first direction 418 and the second wheel 400B is turned to the direction that is substantially the same as the first direction 418, the first wheel 400A may point inwards toward the direction of travel 420 of the vehicle at the angle 422 away from parallel to the direction of travel 420 of the vehicle, and the second wheel 400B may point outwards away from the direction of travel 420 of the vehicle at an angle away from parallel to the direction of travel 420 of the vehicle that is substantially the same as the angle 422 away from parallel to the direction of travel 420 of the vehicle.

In yet another implementation, the structure shown in FIG. 4C may be altered to cause the first wheel 400A to turn the second direction, and the second wheel 400B to turn to a direction that is substantially the same as the second direction. And in such an implementation, when the first wheel 400A is turned to the second direction and the second wheel 400B is turned to the direction that is substantially the same as the second direction, the first wheel 400A may point outwards away from the direction of travel 420 of the vehicle at the angle 422 away from parallel to the direction of travel 420 the vehicle, and the second wheel 400B may point inwards toward the direction of travel 420 of the vehicle at an angle away from parallel to the direction of travel 420 of the vehicle that is substantially the same as the angle 422 away from parallel to the direction of travel 420 the vehicle.

Figure 4D:
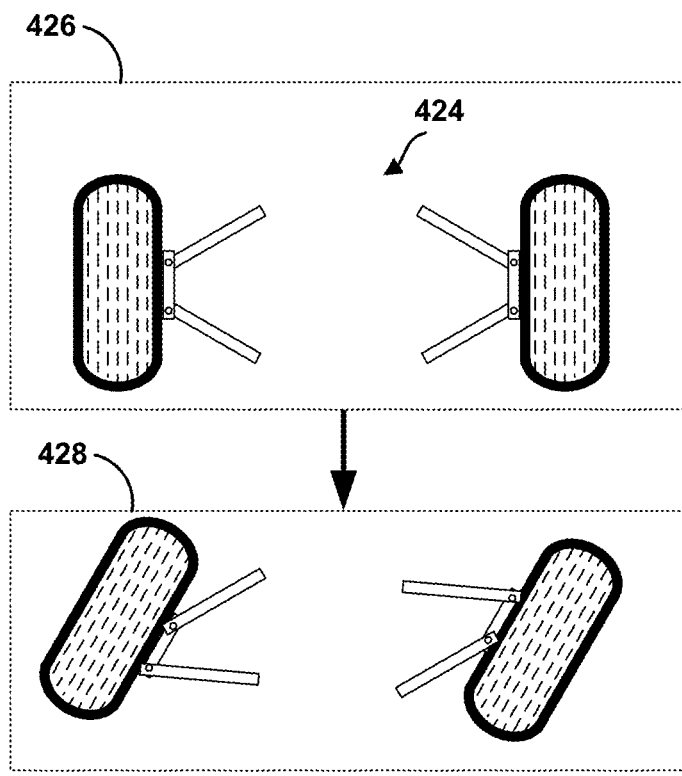
FIG. 4D is another conceptual illustration of example mechanical structures for implementing steering-based oscillatory braking.

FIG. 4D shows a conceptual example illustration of toe control links 424 that may be used to manipulate the position of wheels. In one example, the toe control links 424 may be positioned by an autonomous vehicle in a manner that causes the wheels to point inward or outward. The toe control links 424 may be utilized on any wheel of the vehicle. In some instances, the rear pair of wheels of the vehicle may utilize the toe control links 424 while the front pair of wheels are positioned on a different mechanical structure.

A vehicle may be configured to move or position the toe control links 424 of a vehicle in order to induce steering-based oscillatory braking. A vehicle may include additional control links or less control links capable of turning a wheel to a first direction and a second direction as described herein at various angles away from a direction parallel to a direction of travel of the vehicle. A toe control link 424 may be coupled to a steering arm or tie rods in some examples.

Within the example shown in FIG. 4D, the top illustration 426 shows the wheels of a vehicle in a normal orientation that is used to drive in a straight forward path. The toe control links 424 are positioned in a manner that keep the wheels straight as the vehicle travels. The bottom illustration 428 shows the toe control links 424 in different positions to manipulate the wheels into a first direction and/or a direction that is substantially the same as the first direction as described herein. In other examples, the toe control links 424 may be repositioned by a vehicle in a manner that causes the wheels to be positioned in a second direction and/or a direction that is substantially the same as the second direction as described herein. Further, a computing device may cause the steering system or another system of the vehicle to position the toe control links 424 in a manner that increases or decreases an angle away from parallel to a direction of travel of the vehicle as described herein.

As noted, a vehicle may be equipped with ESC that may improve the safety of the vehicle by selectively applying the brakes of one or more of the wheels in order to navigate the vehicle in an intended path. In some instances, a vehicle may apply braking to counter over-steer or under-steer of the wheels during navigational travel. In one implementation, steering-based oscillatory braking may be used to increase friction of one or more wheels that may improve one or more functions of ESC.

Figure 5A:
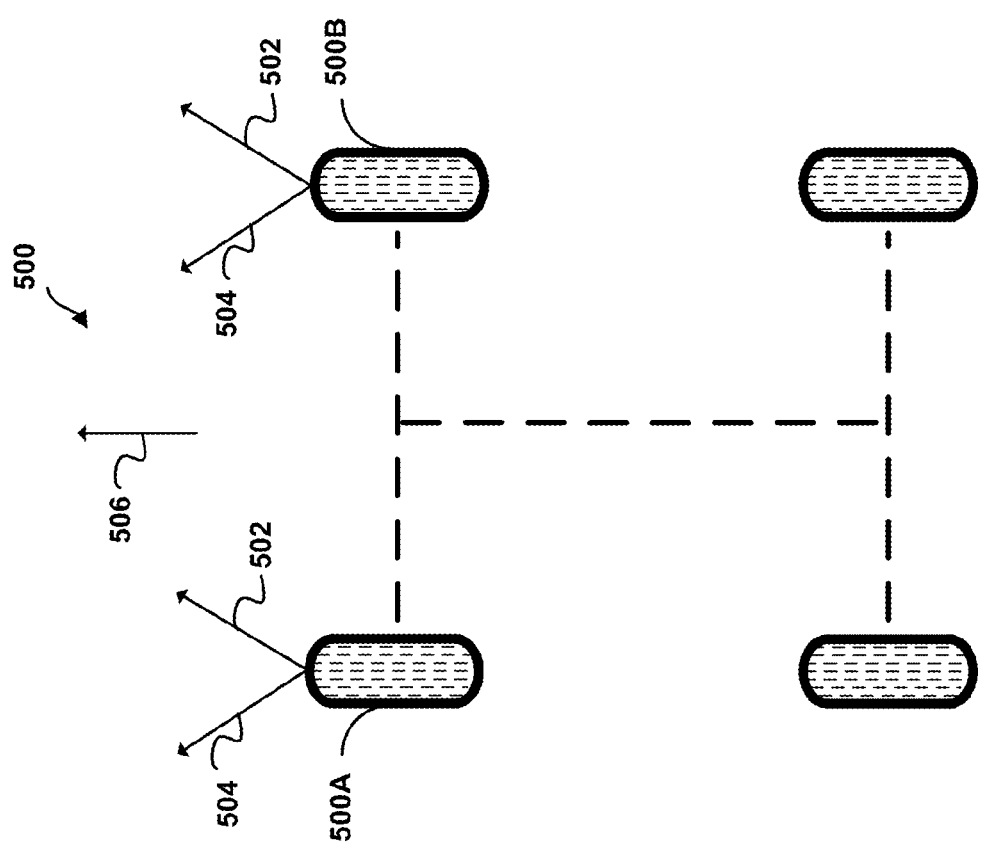
FIG. 5A is a conceptual illustration of example steering-based oscillatory braking.

FIGS. 5A-5B include example conceptual illustrations of steering-based oscillatory braking. The examples include four wheels and dotted line representing the mechanical structure of the vehicle connecting the wheels for illustration purposes. The examples shown within FIGS. 5A-5B are by no means limiting with other example implementations of steering-based oscillatory braking possible.

FIG. 5A is an example conceptual illustration of steering-based oscillatory braking. The example illustrates a possible vehicle configuration turning a pair of wheels 500 in an oscillatory manner, such that a first wheel 500A and a second wheel 500B of the pair of wheels 500 is turned in a first direction 502 and a second direction 504 and turning the pair of wheels 500 oscillates the first wheel 500A and the second wheel 500B between the first direction 502 and the second 504 about a direction of travel 506 of the vehicle.

In the illustrated example, the pair of wheels 500 is a front pair of wheels. However, in other examples, the pair of wheels 500 may be other pairs of wheels, such as a rear pair of wheels. The first wheel 500A and the second wheel 500B may take the form of or be similar in form to the first wheel 400A.

A computing device operating a vehicle may be configured to provide instructions to a system, such as the steering system, to turn the pair of wheels 500 to the first direction 502 and the second direction 504. The computing device may provide the instructions to one or more mechanical or electronic systems to turn the pair of wheels 500 to the first direction 502 and the second direction 504. The instructions may provide that the steering system or another system turn the wheels incrementally to the first direction 502 and the second direction 504. Moreover, the instructions may include turning the pair of wheels 500 at an angle away from parallel to the direction of travel 506 of the vehicle as described with reference to FIG. 3. Further, the instructions may include turning the pair of wheels 500 at a frequency of oscillation as described with reference to FIG. 3.

In another implementation, the computing device may provide instructions to one or more mechanical or electronic systems to turn the first wheel 500A to the first direction 502 and the second direction 504 and the second wheel 500B to a direction that is substantially the same as the first direction 502 and a direction that is substantially the same as the second direction 504. The instructions may provide that the steering system or another system turn the first wheel 500A incrementally to the first direction 502 and the second direction 504 and turn the second wheel 500B incrementally to the direction that is substantially the same as the first direction 502 and the direction that is substantially the same as the second direction 504. Moreover, the instructions may include turning the first wheel 500A and the second wheel 500B at respective angles away from parallel to the direction of travel 506 of the vehicle as described with reference to FIG. 3. Further, the instructions may include turning the first wheel 500A and the second wheel 500B at respective frequencies of oscillation as described with reference to FIG. 3.

Similarly, the computing system may be configured to provide instructions to turn the pair of wheels 500 during a determined time period or distance range. The computing device may take into account factors within the environment and/or one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle to determine the time period and/or the distance range.

As shown by FIGS. 4A-4D, a vehicle may turn the wheels through different mechanical structures, including independent wheel actuators or a traditional steering rack, for example. A vehicle may experience a stabilizing effect from utilizing steering-based oscillatory braking from turning the pair of wheels 500 in an oscillatory manner. The stabilizing effect is likely to keep the vehicle pointed in the direction of travel 506 of the vehicle.

FIG. 5B is another example conceptual illustration of steering-based oscillatory braking. The example illustrates a possible vehicle configuration turning a second pair of wheels 510 in a second oscillatory manner, such that the first wheel 510A and the second wheel 510B of the second pair of wheels 500 is turned in a third direction 512 and a fourth direction 514 and turning the second pair of wheels 510 oscillates the first wheel 510A and the second wheel 510B between the first direction 512 and the second direction 514 about the direction of travel 506 of the vehicle; and turning the second pair of wheels 510 in a second oscillatory manner. In some examples, the second pair of wheels 510 may be turned in the second oscillatory manner the same or similar way as the pair of wheels 500 may be turned in an oscillatory manner as described with reference to FIG. 5A. However, in some examples, the second pair of wheels 510 may be turned in the second oscillatory manner a different way than the pair of wheels 500 may be turned in the oscillatory manner.

In the illustrated example, the second pair of wheels 510 is a rear pair of wheels. However, in other examples, the second pair of wheels 510 may be other pairs of wheels, such as a front pair of wheels. The first wheel 510A and the second wheel 510B may take the form of or be similar in form to the wheel 400A.

A computing device operating a vehicle may be configured to provide instructions to a system, such as the steering system, to turn the second pair of wheels 510 to the third direction 512 and the fourth direction 514. The computing device may provide the instructions to one or more mechanical or electronic systems to turn the second pair of wheels 510 to the third direction 512 and the fourth direction 514. The instructions may provide that the steering system or another system turn the wheels incrementally to the third direction 512 and the fourth direction 514. Moreover, the instructions may include turning the second pair of wheels 510 at a second angle away from parallel to the direction of travel 506 of the vehicle as described with reference to FIG. 3. Further, the instructions may include turning the second pair of wheels 510 at a second frequency of oscillation as described with reference to FIG. 3.

In another implementation, the computing device may provide instructions to one or more mechanical or electronic systems to turn the first wheel 510A to the third direction 512 and the fourth direction 514 and the second wheel 510B to a direction that is substantially the same as the third direction 512 and a direction that is substantially the same as the fourth direction 514. The instructions may provide that the steering system or another system turn the first wheel 510A incrementally to the third direction 512 and the fourth direction 514 and turn the second wheel 510B incrementally to the direction that is substantially the same as the third direction 502 and the direction that is substantially the same as the fourth direction 504. Moreover, the instructions may include turning the first wheel 510A and the second wheel 510B at respective angles away from parallel to the direction of travel 506 of the vehicle as described with reference to FIG. 3. Further, the instructions may include turning the first wheel 510A and the second wheel 510B at respective frequencies of oscillation as described with reference to FIG. 3.

Similarly, the computing system may be configured to provide instructions to turn the second pair of wheels 510 during a determined time period or distance range. The computing device may take into account factors within the environment and/or one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle to determine the time period and/or the distance range.

As shown by FIGS. 4A-4D, a vehicle may turn the wheels through different mechanical structures, including independent wheel actuators or a traditional steering rack, for example. A vehicle may experience a stabilizing effect from utilizing steering-based oscillatory braking from turning the second pair of wheels 510 in a second oscillatory manner. The stabilizing effect is likely to keep the vehicle pointed in the direction of travel 506 of the vehicle.

IV. Example Scenarios

Figure 6A:
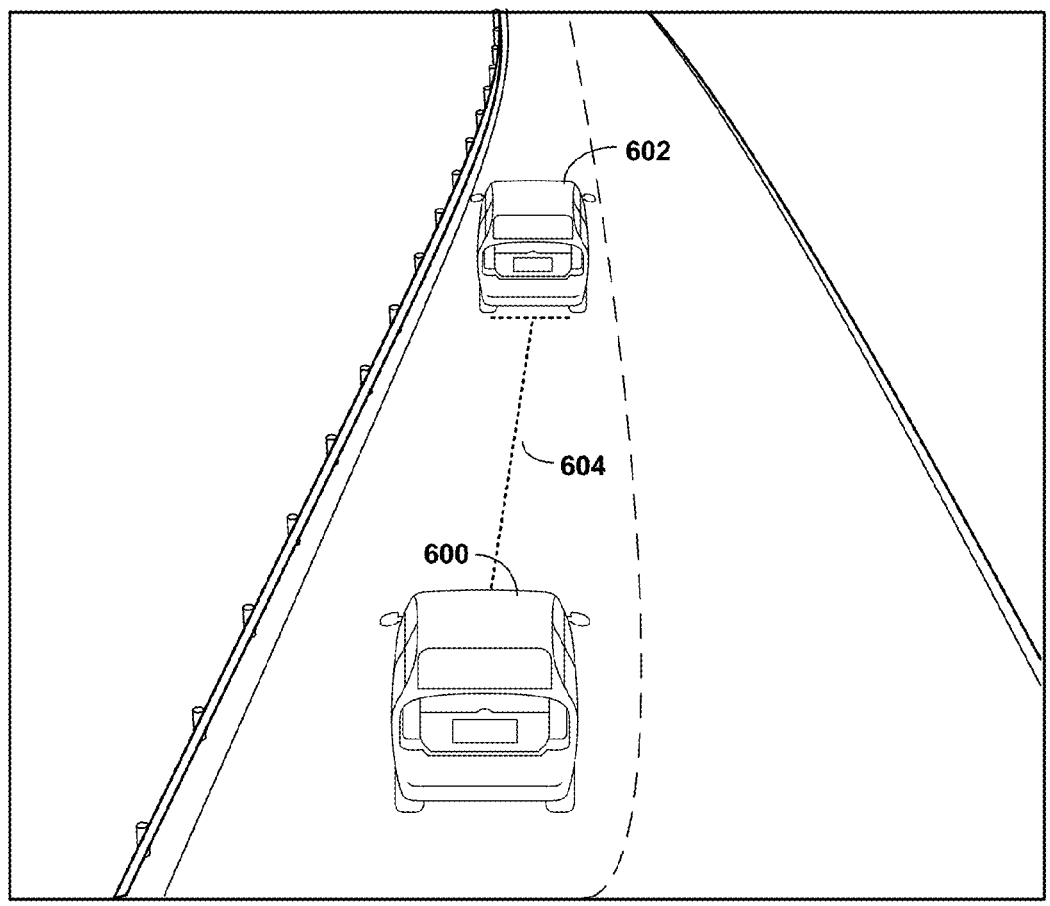
FIG. 6A is a conceptual illustration of an example implementation of steering-based oscillatory braking, which in this instance, is in response to the actions of another vehicle.
Figure 6B:
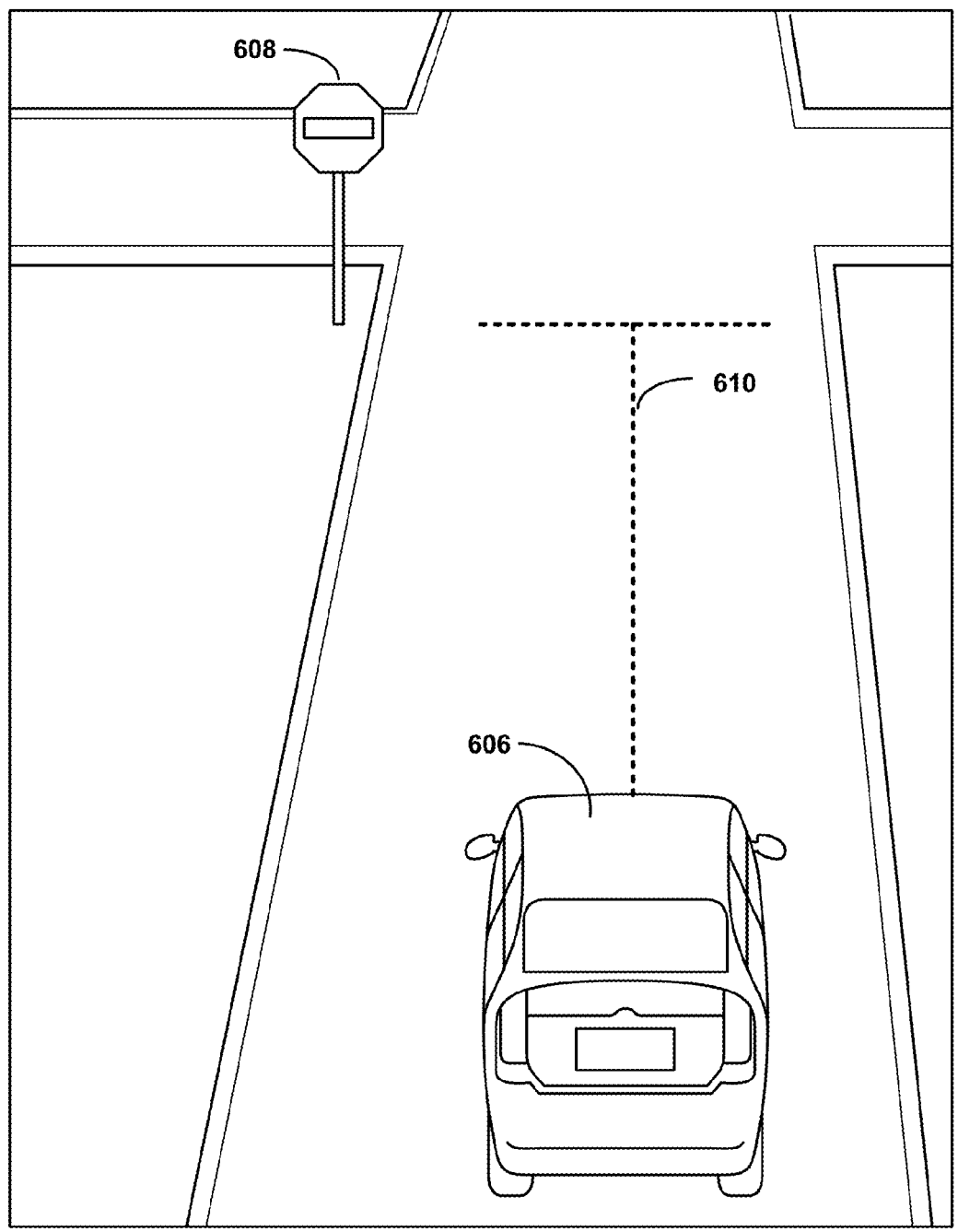
FIG. 6B is a conceptual illustration of an example implementation of steering-based oscillatory braking, which in this instance, is in response to detecting a sign.

FIGS. 6A-6B show example conceptual illustrations of implementing steering-based oscillatory braking. Within the examples, vehicles may be configured to determine the necessity of slowing down or stopping and in response, apply steering-based oscillatory braking to one or more pairs of wheels. The example conceptual illustrations shown in FIGS. 6A-6B serve as examples and are not meant to be limiting. Other example implementations of steering-based oscillatory braking may exist as well. For instance, steering-based oscillatory braking may be used to slow a vehicle prior to entering a corner or while the vehicle is traveling in the corner. And steering-based oscillatory braking may provide steering forces in addition to braking forces.

FIG. 6A shows an example conceptual illustration of implementing steering-based oscillatory braking, which in this instance, is in response to the actions of another vehicle. The example shown includes a vehicle 600 traveling behind a vehicle 602 on a road. In addition to the two vehicles, the example further includes a dotted line that represents a distance 604 between the vehicle 600 and the vehicle 602. Within the example, the vehicle 600 may have determined that a reduction in speed is necessary to avoid colliding into the back of the vehicle 602 based at least in part on the distance 604 between the vehicles.

The vehicle 600 may include one or more computing devices capable of determining that the vehicle should reduce its speed or completely stop. In some implementations, the vehicle may be controlled by a driver and use a computing device to assist the driver in navigation. The vehicle 600 represents any type of vehicle, including vehicle 100 and vehicle 200 discussed in FIGS. 1-2.

A computing device controlling the vehicle 600 may determine that the vehicle 602 is traveling slower than the vehicle 600 and thus a reduction in speed is necessary. Similarly, the computing device of vehicle 600 may determine that the vehicle 602 is braking and determine a reduction in speed is necessary. Other reasons for the vehicle 600 to implement steering-based oscillatory braking may exist as well.

The vehicle 600 may be configured to apply steering-based oscillatory braking in response to receiving information from one or more systems of the vehicle about the surrounding environment. For example, the vehicle 600 may receive information from a LIDAR unit, RADAR, GPS, accelerometers, gyroscopes, or other sensors that allows a computing device to determine whether to implement steering-based oscillatory braking. The information received may also impact the amount of oscillatory braking implemented and/or the timing for applying such braking. For example, a computing device may provide instructions to apply oscillatory braking to all pairs of wheels of a vehicle in a scenario that requires an immediate stopping for the vehicle.

In the example illustrated by FIG. 6A, the vehicle 600 may determine the distance 604 between the vehicle 600 and the vehicle 602. The computing device may factor the speed of both vehicles to determine an amount of time that the vehicle 600 has to apply oscillatory braking to slow down to avoid a collision and continue traveling safely. The vehicle 600 may determine that the distance 604 is decreasing and in response, apply steering-based oscillatory braking to maintain a predetermined distance between the vehicles.

In another example, the vehicle 600 may determine that the vehicle 602 has come to a complete stop or stalled. The vehicle 600 may apply oscillatory braking immediately using one or more pairs of wheels in order to avoid a collision. In some instances, the vehicle 600 may apply steering-based oscillatory braking in response to determining that another braking system of the vehicle has failed or in addition to the other brakes.

FIG. 6B shows an example conceptual illustration of implementing steering-based oscillatory braking, which in this instance, is in response to detecting a sign. The example includes a vehicle 606 that may utilize steering-based oscillatory braking to stop in response to detecting the sign 608. In some instances, the vehicle 606 may slow down using oscillatory braking in response to detecting the sign 608, depending on the type of sign.

A vehicle may receive information from one or more systems of the vehicle that identify the sign 608. In some implementations, the vehicle 606 may detect and determine information about the sign 608, such as sign type. The vehicle 606 may determine a distance between the sign 608 and the vehicle.

In one example, the vehicle 606 may determine that the sign 608 is a stop sign. In response, the vehicle 606 may implement steering-based oscillatory braking to stop at the proper position for the sign 608. In other examples, the sign 608 may represent other types of signs, such as a yield sign, a warning sign, speed limit sign, etc.

In an example, the computing device of the vehicle 606 may first attempt to apply a different type of braking mechanism prior to executing steering-based oscillatory braking. Similarly, the computing device may also apply oscillatory braking in addition to another type of braking mechanism. For example, the vehicle may stop utilizing both brake pads and steering-based oscillatory braking.

The computing device may utilize incoming information to determine the amount of time the vehicle has available prior to reaching the sign 608 at the current rate the vehicle is traveling and apply braking accordingly. For example, the computing device may factor in the amount of friction and/or traction occurring between the wheels of the vehicle and the road in order to determine the extent to apply steering-based oscillatory braking.

In one example, the vehicle 606 may first attempt to use a primary braking system and utilize steering-based oscillatory braking in response to the failure of the primary brake system. Similarly, the vehicle may be capable of utilizing steering-based oscillatory braking in addition to other braking systems.

The computing device may determine that the device has a specific distance represented by the dotted line 610 to execute the slowing down and stopping of the vehicle. The dotted line 610 may represent a distance in some measurable unit or may represent a time range that a computing device may utilize to determine the steering-based oscillatory braking required to accommodate the demands of the environment. The vehicle may determine the distance shown by the dotted line 610 prior to executing steering-based oscillatory braking. The vehicle may utilize the distance shown by the dotted line 610 to determine the amount of oscillatory braking to apply and which pair of wheels should apply oscillatory braking, for example. A vehicle may be configured to execute steering-based oscillatory braking for the distance shown by the dotted line 610 or may use more or less distance.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
   making a determination, by a computing device, to reduce a speed of a vehicle, wherein the vehicle includes a pair of wheels; and
   providing, by the computing device, instructions to a control system of the vehicle to cause a decoupling of a steering wheel of the vehicle from the pair of wheels of the vehicle and to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle, wherein decoupling the steering wheel prevents rotation of the steering wheel when the pair of wheels oscillate.

2. The method of claim 1, further comprising:
   making a determination, by the computing device, that a primary braking system of the vehicle has failed, wherein making a determination to reduce a speed of a vehicle is based at least in part on failure of the primary braking system.

3. The method of claim 1, wherein rotation of a steering wheel of the vehicle is independent of turning of the pair of wheels in an oscillatory manner.

4. The method of claim 1, wherein providing instructions to turn a pair of wheels of the vehicle comprises:
   determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
   determining an angle away from parallel to the direction of travel of the vehicle at which to turn the pair of wheels based at least in part on the one or more parameters; and
   providing instructions to turn the pair of wheels at the angle.

5. The method of claim 1, wherein providing instructions to turn a pair of wheels of the vehicle comprises:
   determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
   determining a frequency of oscillation of the pair of wheels based at least in part on the one or more parameters; and
   providing instructions to turn the pair of wheels at the frequency of oscillation.

6. The method of claim 1, wherein the vehicle includes a second pair of wheels, and the method further comprises:
   providing instructions to turn the second pair of wheels of the vehicle in a second oscillatory manner, such that each wheel of the second pair of wheels is turned in substantially the same direction and turning of the second pair of wheels oscillates each wheel of the second pair of wheels between given directions about the direction of travel of the vehicle so as to reduce the speed of the vehicle.

7. The method of claim 6, wherein providing instructions to turn the pair of wheels and providing instructions to turn the second pair of wheels causes the pair of wheels and the second pair of wheels to synchronously oscillate between given directions about the direction of travel of the vehicle.

8. The method of claim 6, wherein providing instructions to turn the second pair of wheels of the vehicle comprises:
   determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
   determining a second angle away from parallel to the direction of travel of the vehicle at which to turn the second pair of wheels based at least in part on the one or more parameters; and
   providing instructions to turn the second pair of wheels at the second angle.

9. The method of claim 6, wherein providing instructions to turn the second pair of wheels of the vehicle comprises:
   determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
   determining a second frequency of oscillation of the second pair of wheels based at least in part on the one or more parameters; and
   providing instructions to turn the pair of wheels at the second frequency of oscillation.

10. A system comprising:
    at least one processor; and
    a memory having stored thereon instructions that, upon execution by the at least one processor, cause the system to perform functions comprising:
      making a determination to reduce a speed of a vehicle, wherein the vehicle includes a pair of wheels; and
      providing instructions to a control system of the vehicle to cause a decoupling of a steering wheel of the vehicle and to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle, wherein decoupling the steering wheel prevents rotation of the steering wheel when the pair of wheels oscillate.

11. The system of claim 10, wherein the functions further comprise:
    making a determination that a primary braking system of the vehicle has failed, wherein making a determination to reduce a speed of a vehicle is based at least in part on failure of the primary braking system.

12. The system of claim 10, wherein providing instructions to turn a pair of wheels of the vehicle comprises:
    determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
    determining an angle away from parallel to the direction of travel of the vehicle at which to turn the pair of wheels based at least in part on the one or more parameters; and
    providing instructions to turn the pair of wheels at the angle.

13. The system of claim 10, wherein providing instructions to turn a pair of wheels of the vehicle comprises:
    determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
    determining a frequency of oscillation of the pair of wheels based at least in part on the one or more parameters; and
    providing instructions to turn the pair of wheels at the frequency of oscillation.

14. The system of claim 10, wherein the vehicle includes a second pair of wheels, and the functions further comprise:
    providing instructions to turn the second pair of wheels of the vehicle, such that each wheel of the second pair of wheels is turned in substantially the same direction and turning of the second pair of wheels oscillates each wheel of the second pair of wheels between given directions about the direction of travel of the vehicle so as to reduce the speed of the vehicle.

15. A non-transitory computer-readable medium having stored thereon instructions that, upon execution by a computing device, cause the computing device to perform functions comprising:
    making a determination to reduce a speed of a vehicle, wherein the vehicle includes a pair of wheels; and
    providing instructions to a control system of the vehicle to cause a decoupling of a steering wheel of the vehicle from the pair of wheels of the vehicle and to turn the pair of wheels of the vehicle in an oscillatory manner, such that each wheel of the pair of wheels is turned in substantially the same direction and turning of the pair of wheels oscillates each wheel of the pair of wheels between given directions about a direction of travel of the vehicle so as to reduce the speed of the vehicle, wherein decoupling the steering wheel prevents rotation of the steering wheel when the pair of wheels oscillate.

16. The non-transitory computer-readable medium of claim 15, wherein providing instructions to turn a pair of wheels of the vehicle comprises:
    determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
    determining an angle away from parallel to the direction of travel of the vehicle at which to turn the pair of wheels based at least in part on the one or more parameters; and
    providing instructions to turn the pair of wheels at the angle.

17. The non-transitory computer-readable medium claim of 15, wherein providing instructions to turn a pair of wheels of the vehicle comprises:
    determining one or more parameters including the speed of the vehicle, a speed of one or more wheels of the vehicle, a mass of the vehicle, the direction of travel of the vehicle, a desired direction of travel of the vehicle, a steering angle of the vehicle, an operational status of one or more deceleration systems, a deceleration contribution of a particular deceleration system of the one or more deceleration systems, and a desired braking distance of the vehicle;
    determining a frequency of oscillation of the pair of wheels based at least in part on the one or more parameters; and
    providing instructions to turn the pair of wheels at the frequency of oscillation.

* * * * *